United States Patent
DeCusatis et al.

(10) Patent No.: US 9,118,984 B2
(45) Date of Patent: Aug. 25, 2015

(54) CONTROL PLANE FOR INTEGRATED SWITCH WAVELENGTH DIVISION MULTIPLEXING

(71) Applicant: International Business Machines Corporation, Armonk, NY (US)

(72) Inventors: Casimer DeCusatis, Poughkeepsie, NY (US); Rajaram B. Krishnamurthy, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 168 days.

(21) Appl. No.: 13/834,020

(22) Filed: Mar. 15, 2013

(65) Prior Publication Data

US 2014/0270764 A1    Sep. 18, 2014

(51) Int. Cl.
*H04J 14/00* (2006.01)
*H04Q 11/00* (2006.01)
*H04J 14/02* (2006.01)

(52) U.S. Cl.
CPC ............ *H04Q 11/0071* (2013.01); *H04J 14/02* (2013.01); *H04J 14/0267* (2013.01); *H04J 14/0272* (2013.01); *H04Q 11/0062* (2013.01); *H04Q 2011/0073* (2013.01)

(58) Field of Classification Search
CPC .......... H04Q 11/0062; H04Q 11/0067; H04Q 11/0071
USPC .......................................... 398/46, 48, 51, 54
See application file for complete search history.

(56) References Cited

U.S. PATENT DOCUMENTS 6,208,619 B1    3/2001   Takeuchi
6,356,944 B1    3/2002   McCarty
(Continued)

FOREIGN PATENT DOCUMENTS

CN    101313278 A    11/2008
CN    101398770 A    4/2009
(Continued)

OTHER PUBLICATIONS

Notification of Transmittal of the International Search Report and the Written Opinion of the International Searching Authority, or the Declaration; PCT/IB2014/059457; Mailed Jul. 1, 2014, 6 pages.
(Continued)

*Primary Examiner* — Dzung Tran
(74) *Attorney, Agent, or Firm* — Cantor Colburn LLP; Steven Chiu (57) ABSTRACT

A method of controlling optical data flow in a network is provided. The method includes: receiving, by a switch controller, a data flow including a plurality of data packets used for network management and control, the network switch including at least one wavelength tunable optical data transmission interface to a wavelength division multiplexed optical network; transmitting a control signal indicating which wavelengths are in use and which wavelengths are not in use to the network switch over a control link; receiving a return signal generated by an optical filter in the switch, the return signal indicative of an available wavelength for transmission of the data flow to the switch; allocating a data traffic flow to the available wavelength, and communicating the allocation decision to the network switch; and transmitting the data flow to the switch via an optical carrier signal having the available wavelength indicated by the return signal.

25 Claims, 6 Drawing Sheets

(56) References Cited

U.S. PATENT DOCUMENTS

| | | |
|---|---|---|
| 6,504,818 B1 | 1/2003 | Levine |
| 6,504,821 B2 | 1/2003 | Berger |
| 6,947,380 B1 | 9/2005 | Yip et al. |
| 7,187,652 B2 | 3/2007 | Lee et al. |
| 7,234,073 B1 | 6/2007 | Roytman et al. |
| 7,289,453 B2 | 10/2007 | Riedel et al. |
| 7,949,893 B1 | 5/2011 | Knaus et al. |
| 8,069,139 B2 | 11/2011 | Garbow et al. |
| 8,082,466 B2 | 12/2011 | Tanaka et al. |
| 8,724,470 B2 | 5/2014 | Yi et al. |
| 2002/0073354 A1 | 6/2002 | Schroiff et al. |
| 2002/0196749 A1 | 12/2002 | Eyuboglu et al. |
| 2003/0051187 A1 | 3/2003 | Mashayekhi et al. |
| 2004/0153866 A1 | 8/2004 | Guimbellot et al. |
| 2006/0126509 A1 | 6/2006 | Abi-Nassif et al. |
| 2006/0215550 A1 | 9/2006 | Malhotra |
| 2007/0204266 A1 | 8/2007 | Beaty et al. |
| 2007/0220121 A1 | 9/2007 | Suwarna |
| 2008/0137669 A1 | 6/2008 | Balandina et al. |
| 2008/0192752 A1 | 8/2008 | Hyslop et al. |
| 2009/0089609 A1 | 4/2009 | Baba |
| 2009/0213861 A1 | 8/2009 | Benner et al. |
| 2009/0232001 A1 | 9/2009 | Gong et al. |
| 2010/0014487 A1 | 1/2010 | Attar et al. |
| 2010/0027420 A1 | 2/2010 | Smith |
| 2010/0138686 A1 | 6/2010 | Arata et al. |
| 2010/0146327 A1 | 6/2010 | Takubo |
| 2010/0166424 A1 | 7/2010 | Nagarajan et al. |
| 2010/0214970 A1 | 8/2010 | Brunner et al. |
| 2010/0238805 A1 | 9/2010 | Ludwig et al. |
| 2010/0302935 A1 | 12/2010 | Zhang et al. |
| 2011/0026437 A1 | 2/2011 | Roja-Cessa et al. |
| 2011/0032821 A1 | 2/2011 | Morrill et al. |
| 2011/0085444 A1 | 4/2011 | Ko et al. |
| 2011/0090797 A1 | 4/2011 | Beecroft |
| 2011/0135305 A1 | 6/2011 | Barnard |
| 2011/0142450 A1* | 6/2011 | Tanzi et al. ............... 398/79 |
| 2011/0158647 A1 | 6/2011 | Solheim et al. |
| 2011/0158658 A1 | 6/2011 | Myslinski et al. |
| 2011/0211834 A1 | 9/2011 | Ansari et al. |
| 2011/0242966 A1 | 10/2011 | Van Caenegem |
| 2011/0261696 A1 | 10/2011 | Crisan et al. |
| 2011/0261831 A1 | 10/2011 | Sharma et al. |
| 2011/0271007 A1 | 11/2011 | Wang et al. |
| 2011/0273988 A1 | 11/2011 | Tourrilhes et al. |
| 2011/0283016 A1 | 11/2011 | Uchida |
| 2011/0286324 A1* | 11/2011 | Bellagamba et al. ......... 370/219 |
| 2011/0292830 A1 | 12/2011 | Yanggratoke et al. |
| 2011/0299389 A1 | 12/2011 | Mau et al. |
| 2011/0305167 A1 | 12/2011 | Koide |
| 2011/0305288 A1 | 12/2011 | Liu et al. |
| 2012/0008958 A1 | 1/2012 | Dahlfort et al. |
| 2012/0014284 A1 | 1/2012 | Ranganathan et al. |
| 2012/0014693 A1 | 1/2012 | Cheng et al. |
| 2012/0020361 A1 | 1/2012 | Ueno |
| 2012/0023231 A1 | 1/2012 | Ueno |
| 2012/0030306 A1 | 2/2012 | Kami |
| 2012/0195201 A1 | 8/2012 | Ishikawa |
| 2012/0221887 A1 | 8/2012 | Hansson et al. |
| 2012/0250496 A1 | 10/2012 | Kato |
| 2012/0287782 A1 | 11/2012 | Lv et al. |
| 2013/0010600 A1* | 1/2013 | Jocha et al. ............... 370/236.2 |
| 2013/0054761 A1 | 2/2013 | Kempf et al. |
| 2013/0250770 A1 | 9/2013 | Zou et al. |
| 2013/0258843 A1 | 10/2013 | Kurita |
| 2013/0258847 A1 | 10/2013 | Zhang et al. |
| 2013/0266317 A1* | 10/2013 | Wang ............... 398/48 |
| 2013/0268686 A1 | 10/2013 | Wang et al. |
| 2013/0294236 A1 | 11/2013 | Beheshti-Zavareh et al. |
| 2014/0016647 A1* | 1/2014 | Yoshida et al. ......... 370/395.53 |
| 2014/0092907 A1 | 4/2014 | Sridhar et al. |
| 2014/0119193 A1 | 5/2014 | Anand et al. |
| 2014/0126907 A1 | 5/2014 | Hirth et al. |
| 2014/0178066 A1* | 6/2014 | Patel et al. ............... 398/45 |
| 2014/0258774 A1 | 9/2014 | Taylor et al. |

FOREIGN PATENT DOCUMENTS

| | | |
|---|---|---|
| CN | 101677321 A | 3/2010 |
| CN | 101997644 A | 3/2011 |
| CN | 102291389 A | 12/2011 |
| EP | 0876023 | 11/1998 |
| GB | 2313268 A | 5/1996 |
| JP | 2011166700 A | 8/2011 |
| WO | 9930462 | 6/1999 |
| WO | 2009113106 A2 | 9/2009 |
| WO | 2011037104 A1 | 9/2010 |
| WO | 2011037148 A1 | 3/2011 |
| WO | 2011065268 A1 | 3/2011 |
| WO | 2011118575 A1 | 9/2011 |
| WO | 2012056816 A1 | 5/2012 |

OTHER PUBLICATIONS

PCT Notification of Transmittal of the International Search Report and the Written Opinion of the International Searching Authority, or the Declaration, Application No. PCT/IB2014/059460; International Filing Date: Mar. 5, 2014; Date of Mailing: Jun. 30, 2014; 9 pages.

PCT Notification of Transmittal of the International Search Report and the Written Opinion of the International Searching Authority, or the Declaration, Application No. PCT/IB2014/059459; International Filing Date: Mar. 5, 2014; Date of Mailing: Jun. 30, 2014; 10 pages.

Curtis, et al. "DevoFlow: Scaling Flow Management for High-Performance Netowrks". SIGCOMM'11, Aug. 15-19, 2011, Toronto, Ontario, Canada.

Egilmez, et al. "Scalable video streaming over OpenFlow networks: An optimization framework for QoS Routing". 2011 18th IEEE International Confernece on Image Processing (ICIP), 2241-2244.

El-Azzab, et al. "Slices isolator for a virtualized openflow node", (2011) First International Symposium on Network Cloud Computing and Applications (NCCA), 121-126.

Li, Z., et al. Compatib le TDM/WDM PON using a Single Tunable Optical Filter for both Downstream Wavelength Selection and Upstream Wavelength Generation. IEEE Photonics Technology Letters, vol. 24, No. 10, May 15, 2012. pp. 797-799.

Liu, et al. "Open Flow-based Wavelength Path Control in Transparent Optical networks: a Proof-of-Concept Demonstration" Sep. 2011, 37th European conference and Exhibition on Optical communication (ECOC).

McKeown et al., "OpenFlow: Enabling Innovation in Campus Networks", Mar. 14, 2008, 6 pages.

McKeown, et al. "OpenFlow: Enabling Innovation in Campus Networks". ACM SIGCOMM Computer Communication Review, 38(2), 69-74.

Johnson, RD.et al.; "Detection of a Working Master Controller by a Slave Card"; http://www.ip.com/pubview/IPCOM000099594D; Feb. 1, 1990, 3 pages.

IBM "Software Defined Networking, A new paradigm for virtual dynamic, flexible networking," IBM Systems and Technology, Oct. 2012, 6 pages.

Anonymous; "Intelligent VM Migration Based on Relative VM Priority and Relative Suitability of Migration Target"; http://priorartdatabase.com/IPCOM/000201632; Nov. 16, 2010, 3 pages.

Anonymous; "Management framework for efficient live migration of virtual machines running migration-aware applications";http://priorartdatabase.com/IPCOM000200260; Oct. 3, 2010, 5 pages.

Pfaff, B.et al.; "Open Flow Switch Specification"; www.openflow.org/document/openflow_spec_v1.0.0.pdf; Feb. 28, 2011, 56 pages.

IBM; "The automatic determination of master-slave relationship between embedded controllers by mearns of a shared hardware access switch"; http://www.ip.com/pubview/IPCOM000020741D; Dec. 11, 2003, 5 pages.

Wang et al., "Dynamic Bandwidth Allocation for Preventing Congestion in Data Center Networks," ISNN 2011, Part III, LNCS 6677, pp. 160-167, 2011.

(56) References Cited

OTHER PUBLICATIONS

Yong, S. et al, "XOR Retransmission in Multicast Error Recovery". Networks, 2000 (ICON2000). Proceedings. IEEE International Conference. pp. 336-340.

U.S. Appl. No. 13/833,886; Non-Final Office Action; Date Filed: Mar. 15, 2013; Date Mailed: Dec. 17, 2014; 32 pages.

U.S. Appl. No. 13/833,796; Non-final Office Action; Date Filed Mar. 15, 2013; Date Mailed: Dec. 19, 2014; 31pages.

U.S. Appl. No. 13/833,952; Non-FinalOffice Action; Date Filed: Mar. 15, 2013; Date Mailed: Nov. 3, 2014; 39 pages.

U.S. Appl. No. 13/834,502; Non-Final Office Action; Date Filed: Mar. 15, 2013; Date Mailed: Dec. 4, 2014; 37 pages.

U.S. Appl. No. 14/501,663; Non-Final Office Action; Date Filed: Sep. 30, 2014; Date Mailed: Dec. 19, 2014; 11 pages.

U.S. Appl. No. 14/501,945; Non-Final Office Action, Date Filed: Sep. 30, 2014; Date Mailed: Jan. 5, 2015; 29 pages.

U.S. Appl. No. 14/502,043; Non-Final Office Action; Date Filed: Sep. 30, 2014; Date Mailed: Dec. 23, 2014; 17 pages.

U.S. Appl. No. 13/834,117; Non-Final Office Action; Date Filed: Mar. 15, 2013; Date Mailed: Feb. 26, 2015, 61 pages.

U.S. Appl. No. 14/501,457, Non-Final Office Action; Date Filed Sep. 30, 2014; Date Mailed: Mar. 18, 2015; 29 pages.

\* cited by examiner

CONTROL PLANE FOR INTEGRATED SWITCH WAVELENGTH DIVISION MULTIPLEXING

BACKGROUND

Ethernet networks are typically employed in local area networks (LANs) that include a plurality of network switches. A number of communication protocols have been developed and continue to evolve to enhance Ethernet network performance for various environments. For example, an enhancement to Ethernet, called data center bridging (DCB), converged enhanced Ethernet (CEE) or data center Ethernet (DCE), supports the convergence of LANs with storage area networks (SANs). Other protocols that can be used in a data center environment in conjunction with Ethernet include, for instance, Fibre Channel over Ethernet (FCoE), Internet Wide Area Remote direct memory access Protocol (iWARP), Remote direct memory access over Converged Ethernet (RoCE).

Such networks may include network entities or groups of entities (e.g., data centers) that are connected to various locations via optical fibers. For example, data centers may be connected to separate optical transmission systems such as reconfigurable optical add-drop multiplexer (ROADM) systems for long-haul transmission of data. Such optical transmission systems include a control plane distinct from the control planes of individual data centers or Ethernet networks to which they are connected.

SUMMARY

According to one embodiment, a method of controlling optical data flow in a network is provided. The method includes: receiving, by a switch controller, a data flow including a plurality of data packets used for network management and control, the switch controller configured to control routing through a network switch, the switch controller in communication with the network switch via a control link, the network switch including at least one wavelength tunable optical data transmission interface to a wavelength division multiplexed optical network; transmitting a control signal indicating which wavelengths are in use and which wavelengths are not in use to the network switch over a control link; receiving a return signal from the network switch, the return signal generated by an optical filter in the switch, the return signal indicative of an available wavelength for transmission of the data flow to the switch; allocating a data traffic flow to the available wavelength, and communicating the allocation decision to the network switch; and transmitting the data flow to the switch via an optical carrier signal having the available wavelength indicated by the return signal.

According to another embodiment, a method of controlling optical data flow in a network is provided. The method includes: receiving an optical signal at a network switch from a network controller, the network switch configured to receive and route data packets in a network, the optical signal including a plurality of wavelengths corresponding to an optical communication bandwidth the network switch including at least one wavelength tunable optical data transmission interface to a wavelength division multiplexed optical network; generating a return optical signal by an optical filter in the switch and transmitting the return signal over a control link to the network controller, the return signal indicative of an available wavelength for transmission of the data flow to the switch; receiving the data flow via an optical carrier signal having the available wavelength indicated by the return signal; and routing the data flow to a destination based on instructions from the network controller.

According to yet another embodiment, an apparatus for controlling optical data flow in a network is provided. The apparatus includes a memory having computer readable computer instructions and a processor for executing the computer readable instructions, the instructions for: receiving, by a switch controller, a data flow including a plurality of data packets used for network management and control, the switch controller configured to control routing through a network switch, the switch controller in communication with the network switch via a control link, the network switch including at least one wavelength tunable optical data transmission interface to a wavelength division multiplexed optical network; transmitting a control signal indicating which wavelengths are in use and which wavelengths are not in use to the network switch over a control link; receiving a return signal from the network switch, the return signal generated by an optical filter in the switch, the return signal indicative of an available wavelength for transmission of the data flow to the switch; allocating a data traffic flow to the available wavelength, and communicating the allocation decision to the network switch; and transmitting the data flow to the switch via an optical carrier signal having the available wavelength indicated by the return signal.

According to a further embodiment, a computer program product for controlling optical data flow in a network is provided. The computer program product includes a tangible storage medium readable by a processing circuit and storing instructions for execution by the processing circuit for performing a method including: receiving, by a switch controller, a data flow including a plurality of data packets used for network management and control, the switch controller configured to control routing through a network switch, the switch controller in communication with the network switch via a control link, the network switch including at least one wavelength tunable optical data transmission interface to a wavelength division multiplexed optical network; transmitting a control signal indicating which wavelengths are in use and which wavelengths are not in use to the network switch over a control link; receiving a return signal from the network switch, the return signal generated by an optical filter in the switch, the return signal indicative of an available wavelength for transmission of the data flow to the switch; allocating a data traffic flow to the available wavelength, and communicating the allocation decision to the network switch; and transmitting the data flow to the switch via an optical carrier signal having the available wavelength indicated by the return signal.

According to a still further embodiment, a computer program product for controlling optical data flow in a network is provided. The computer program product includes a tangible storage medium readable by a processing circuit and storing instructions for execution by the processing circuit for performing a method including: a tangible storage medium readable by a processing circuit and storing instructions for execution by the processing circuit for performing a method comprising: receiving an optical signal at a network switch from a network controller, the network switch configured to receive and route data packets in a network, the optical signal including a plurality of wavelengths corresponding to an optical communication bandwidth, the network switch including at least one wavelength tunable optical data transmission interface to a wavelength division multiplexed optical network; generating a return optical signal by an optical filter in the switch and transmitting the return signal over an optical link to the network controller, the return signal indicative of an available wavelength for transmission of the data flow to the switch; receiving the data flow via an optical carrier signal having the available wavelength indicated by the return signal; and routing the data flow to a destination based on instructions from the network controller.

Additional features and advantages are realized through the embodiments described herein. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter of embodiments described herein is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Exemplary embodiments relate to processing and routing data in a network that includes optical signal connections. An embodiment of a network switch control device and/or system provides a control plane that integrates control of network switches with optical signal processing and switching control. In one embodiment, the network includes a network controller configured to control routing parameters in one or more switches. The controller includes an optical interface system configured to receive data transmitted via optical carrier signals and/or transmit the data via optical carrier signals to one or more switches for forwarding and/or routing to a destination. The controller thus provides a management and control plane interface to the switch for both optical and electrical signals.

In one embodiment, the one or more switches each include at least one optical port connected to a WDM module configured to receive optical data signals at one or more selected or available wavelengths. The WDM module may include an optical filter configured to provide a feedback signal to the controller to indicate wavelength(s) that are available for the switch and/or a destination coupled to the switch.

In one embodiment, the controller includes a wavelength-tunable laser or other light source and is configured to provide a connection between a data source and a switch/destination by identifying wavelengths in a transmission bandwidth (e.g. WDM or DWDM bandwidths) that are available for the switch/destination. The controller may identify the available wavelengths by receiving wavelength information from a server or other entity, or by providing a scanning optical signal to the switch filter and receiving a feedback signal indicative of available wavelength(s).

Figure 1:
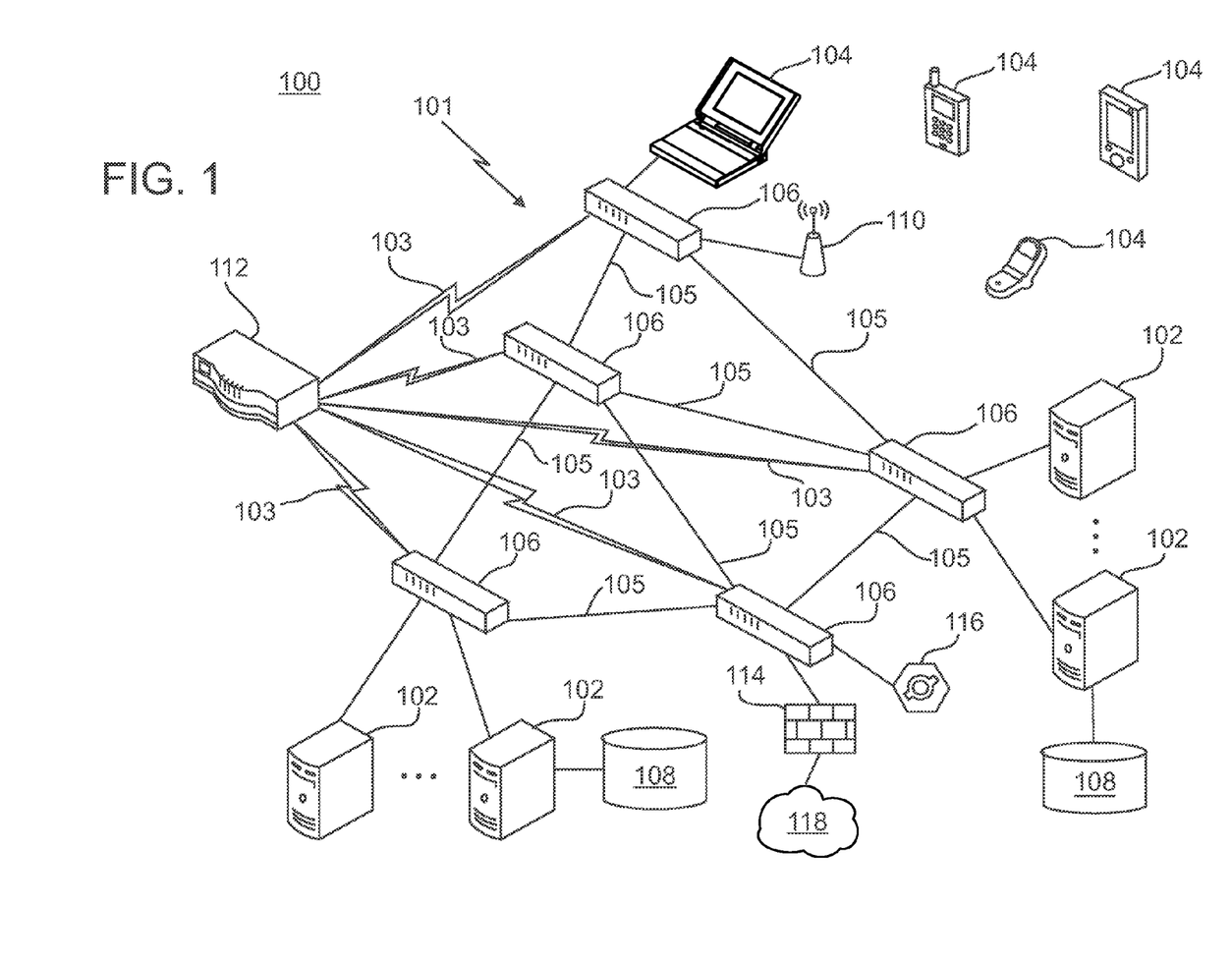
FIG. 1 depicts a block diagram of a system including a network with OpenFlow-capable switches that may be implemented according to an embodiment.

Turning now to FIG. 1, an example of a system 100 including a network 101 that supports OpenFlow will now be described in greater detail. In the example depicted in FIG. 1, the system 100 is a data center environment including a plurality of servers 102 and client systems 104 configured to communicate over the network 101 using switches 106 that are OpenFlow-capable. In exemplary embodiments, the servers 102, also referred as hosts or host systems, are high-speed processing devices (e.g., mainframe computers, desktop computers, laptop computers, hand-held devices, embedded computing devices, or the like) including at least one processing circuit (e.g., a computer processor/CPU) capable of reading and executing instructions, and handling interactions with various components of the system 100. The servers 102 may be storage system servers configured to access and store large amounts of data to one or more data storage systems 108.

The client systems 104 can include a variety of desktop, laptop, general-purpose computer devices, mobile computing devices, and/or networked devices with processing circuits and input/output (I/O) interfaces, such as keys/buttons, a touch screen, audio input, a display device and audio output. The client systems 104 can be linked directly to one or more of the switches 106 or wirelessly through one or more wireless access points 110.

The data storage systems 108 refer to any type of computer readable storage media and may include one or more secondary storage elements, e.g., hard disk drive (HDD), solid-state memory, tape, or a storage subsystem that is internal or external to the servers 102. Types of data that may be stored in the data storage systems 108 include, for example, various files and databases. There may be multiple data storage systems 108 utilized by each of the servers 102, which can be distributed in various locations of the system 100.

The system 100 also includes a network controller 112 that is a central software defined network controller configured to make routing decisions within the network 101. The network controller 112 establishes one or more secure links 103 to configure the switches 106 and establish communication properties of links 105 between the switches 106. For example, the network controller 112 can configure the switches 106 to control packet routing paths for data flows between the servers 102 and client systems 104, as well as one or more firewalls 114 and one or more load balancers 116. The one or more firewalls 114 restrict access and the flow of network traffic between the network 101 and one or more external networks 118. The one or more load balancers 116 can distribute workloads across multiple computers, such as between the servers 102.

The servers 102, client systems 104, and network controller 112 can include various computer/communication hardware and software technology known in the art, such as one or more processing units or circuits, volatile and non-volatile memory including removable media, power supplies, network interfaces, support circuitry, operating systems, and the like. Although the network controller 112 is depicted as a separate component, it will be understood that network configuration functionality can alternatively be implemented in one or more of the servers 102 or client systems 104 in a standalone or distributed format.

The network 101 can include a combination of wireless, wired, and/or fiber optic links. The network 101 as depicted in FIG. 1 represents a simplified example for purposes of explanation. Embodiments of the network 101 can include numerous switches 106 (e.g., hundreds) with dozens of ports and links per switch 106. The network 101 may support a variety of known communication standards that allow data to be transmitted between the servers 102, client systems 104, switches 106, network controller 112, firewalls(s) 114, and load balancer(s) 116. Communication protocols are typically implemented in one or more layers, such as a physical layer (layer-1), a link layer (layer-2), a network layer (layer-3), a transport layer (layer-4), and an application layer (layer-5). In exemplary embodiments, the network 101 supports Open-Flow as a layer-2 protocol. The switches 106 can be dedicated OpenFlow switches or OpenFlow-enabled general purpose switches that also support layer-2 and layer-3 Ethernet.

In one embodiment, one or more of the switches 106 is configured to receive optical signals from one or more sources over fiber optic connections. Each switch 106 so configured may include an optical transponder configured to convert between optical and electrical signals. In this embodiment, the controller 112 is connected to each switch 106 via an optical link (e.g., optical fiber(s)) and includes a tunable laser and modulator for transmitting optical signals to each switch 106. The controller 112 also includes optics and associated components configured to separate (demultiplex) an incoming optical signal into a plurality of wavelengths and establish links between data flow sources and the switches 106 by identifying wavelengths within a communication bandwidth that are available for each switch 106.

Figure 2:
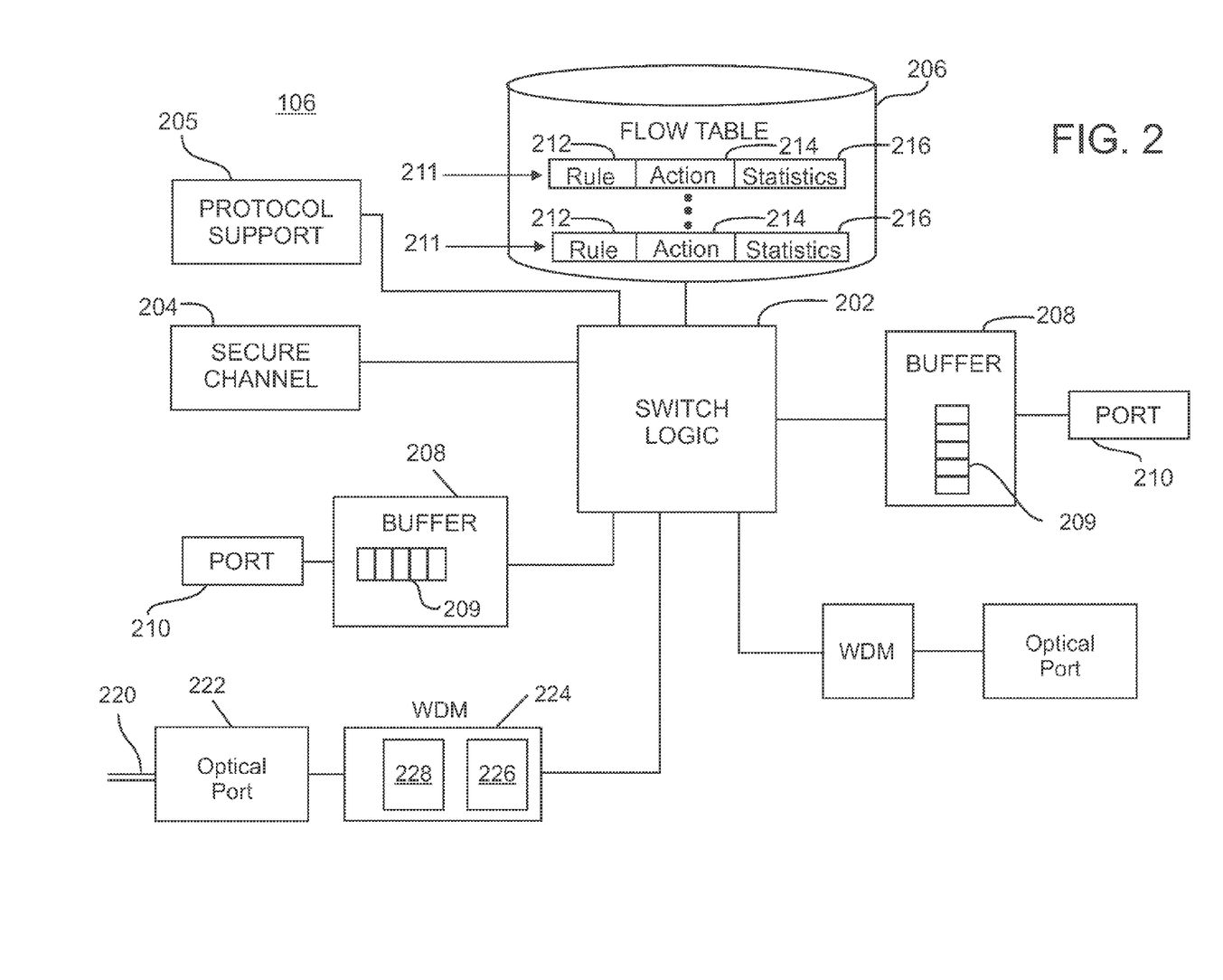
FIG. 2 depicts a block diagram of an OpenFlow-capable switch according to an embodiment.

In one embodiment, one or more switches 106 include a tunable wavelength-division multiplexer (WDM) that includes a wavelength filter. The wavelength filter scans wavelengths in the bandwidth and returns a feedback signal indicating the wavelength at which data flow can be forwarded through the switch 106. In this way, an optical connection can be established between the source and a destination (e.g., another switch or data center), and optical signals can be routed, based only on wavelength identification without requiring a light source in the switch. FIG. 2 depicts a block diagram of the switch 106 of FIG. 1 that supports OpenFlow. The switch 106 includes switch logic 202, secure channel 204, protocol support 205, flow table 206, buffers 208 including various queues 209, and ports 210 (e.g., Ethernet ports). The switch logic 202 may be implemented in one or more processing circuits, where a computer readable storage medium is configured to hold instructions for the switch logic 202, as well as various variables and constants to support operation of the switch 106. The switch logic 202 forwards packets between the ports 210*a*-210*n* as flows defined by the network controller 112 of FIG. 1.

The secure channel 204 connects the switch 106 to the network controller 112 of FIG. 1. The secure channel 204 allows commands and packets to be communicated between the network controller 112 and the switch 106 via the Open-Flow protocol. The secure channel 204 can be implemented in software as executable instructions stored within the switch 106. Protocol details to establish a protocol definition for an implementation of OpenFlow and other protocols can be stored in the protocol support 205. The protocol support 205 may be software that defines one or more supported protocol formats. The protocol support 205 can be embodied in a computer readable storage medium, for instance, flash memory, which is configured to hold instructions for execution by the switch logic 202. Implementing the protocol support 205 as software enables updates in the field for new versions or variations of protocols and can provide OpenFlow as an enhancement to existing conventional routers or switches.

The controller 112 may also be connected to the switch 106 via an optical link 220 such as a fiber optic connector. The switch includes an optical port 222 to receive optical signals and an optical processing unit such as a wavelength division multiplexing (WDM) unit 224 that performs various processes such as demultiplexing, multiplexing and converting optical signals to electrical signals for forwarding through ports 210 or for wavelength conversion. In one embodiment, the WDM unit 224 includes an optical transponder that includes a converter 226. In one embodiment, the WDM unit includes a tunable wavelength filter 228 that may be tuned based on available transmission wavelengths.

The flow table 206 defines supported connection types associated with particular addresses, virtual local area networks or switch ports, and is used by the switch to process data flows received at the switch. A data flow is a sequence of data packets grouped in some manner, e.g., by source and/or destination, or otherwise defined by selected criteria. Each data flow may be mapped to a port and associated queue based on the flow table 206. For example, a data flow is defined as all packets that match a particular header format. Data flows may be received by the switch 106 via the Ethernet ports 210, the secure channel 204 and/or via modulated optical carrier signals in the optical link 220.

Each entry 211 in the flow table 206 can include one or more rules 212, actions 214, and statistics 216 associated with a particular flow. The rules 212 define each flow and can be determined by packet headers. The actions 214 define how packets are processed. The statistics 216 track information such as the size of each flow (e.g., number of bytes), the number of packets for each flow, and time since the last matching packet of the flow or connection time. Examples of actions include instructions for forwarding packets of a flow to one or more specific ports 210*a*-210*n* (e.g., unicast or multicast), encapsulating and forwarding packets of a flow to the network controller 112 of FIG. 1, and dropping packets of the flow. Entries 211 in the flow table 206 can be added and removed by the network controller 112 of FIG. 1 via the secure channel 204. The network controller 112 of FIG. 1 can pre-populate the entries 211 in the flow table 206. Additionally, the switch 106 can request creation of an entry 211 from the network controller 112 upon receiving a flow without a corresponding entry 211 in the flow table 206.

The buffers 208 provide temporary storage in queues 209 for flows as packets are sent between the ports 210 and/or 222. In a lossless configuration, rather than dropping packets when network congestion is present, the buffers 208 temporarily store packets until associated ports and links are available. Each of the buffers 208 may be associated with a particular port, flow, or sub-network. Each of the buffers 208 is logically separate but need not be physically independent. Accordingly, when one of the buffers 208 is full, it does not adversely impact the performance of the other buffers 208 within the switch 106.

In operation, when the switch 106 receives a packet, the switch 106 attempts to match the packet by comparing fields (referred to as "match fields") to corresponding fields in flow entries of each flow table 206. Exemplary match fields include ingress port and metadata fields, as well as header fields such as those described below in reference to FIG. 3. In one embodiment, matching starts at the first flow table and may continue to additional flow tables.

If no match is found, the switch 106 may perform an action based on the switch configuration, e.g., the packet may be forwarded to the controller or dropped. If the packet matches a flow entry in a flow table, the corresponding instruction set is executed based on the flow entry, e.g., the actions field 214. For example, when a packet is matched to a flow entry including an output action, the packet is forwarded to one of ports 210 and/or 222 specified in the flow entry.

Figure 3:
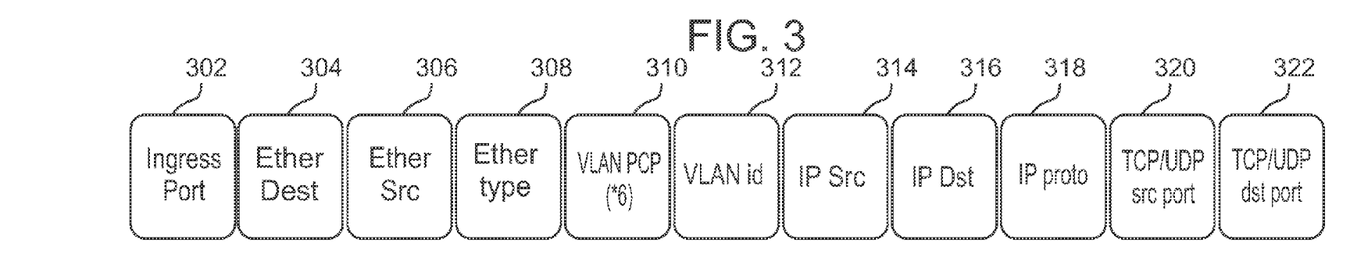
FIG. 3 depicts an example of an OpenFlow flow switching definition that can be used in embodiments.

FIG. 3 depicts an example of an OpenFlow flow switching definition 300 that can be used in embodiments. The OpenFlow flow switching definition 300 is a packet header that defines the flow and includes a number of fields. In this example, the switching definition 300 is a flow header that includes up to eleven tuples or fields; however, not all tuples need to be defined depending upon particular flows. In the example of FIG. 3, the OpenFlow flow switching definition 300 includes tuples for identifying an ingress port 302, an Ethernet destination address 304, an Ethernet source address 306, an Ethernet type 308, a virtual local area network (VLAN) priority 310, a VLAN identifier 312, an Internet protocol (IP) source address 314, an IP destination address 316, an IP protocol 318, a transmission control protocol (TCP)/user datagram protocol (UDP) source port 320, and a TCP/UDP destination port 322. The Ethernet destination address 304 may represent a layer-2 Ethernet hardware address or media access control (MAC) address used in legacy switching and routing. The IP destination address 316 may represent a layer-3 IP address used in legacy switching and routing. Flow switching can be defined for any combination of tuples in the OpenFlow flow switching definition 300, with a particular combination of tuples serving as a key. For example, flows can be defined in a rule 212 of FIG. 2 by exact matching or wildcard matching for aggregated MAC-subnets, IP-subnets, ports, VLAN identifiers, and the like.

Figure 4:
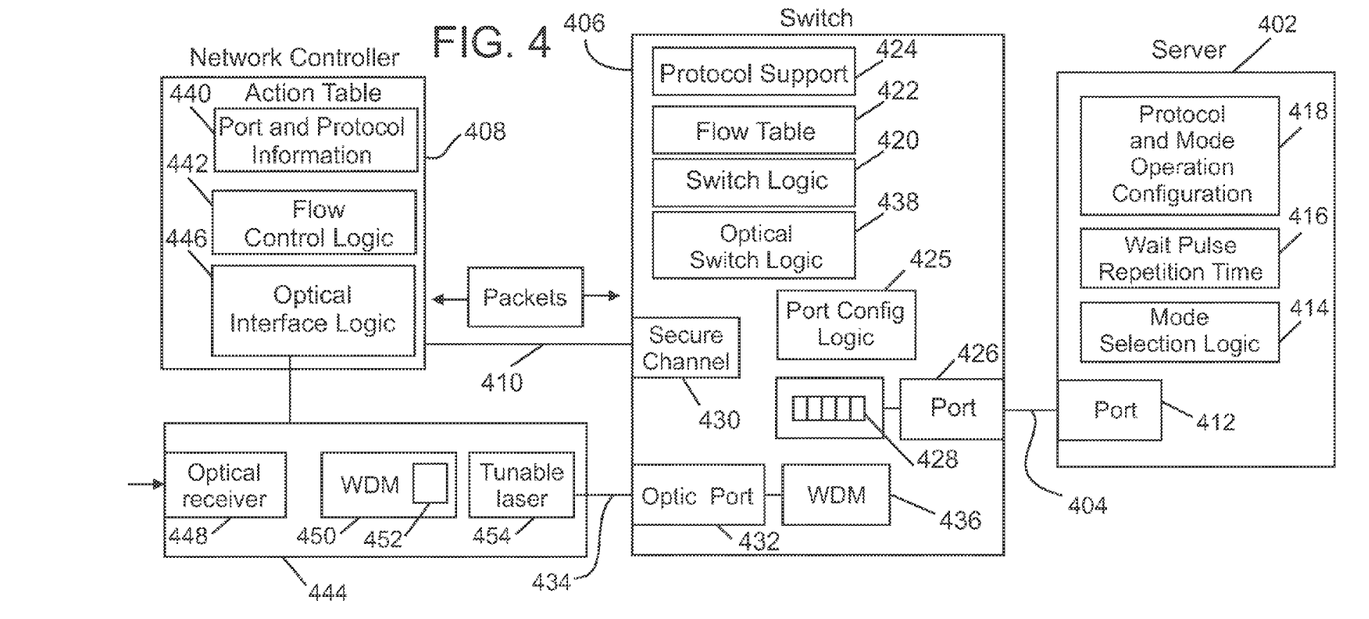
FIG. 4 depicts an exemplary embodiment of a portion of a network including a network switch and a switch controller.

FIG. 4 depicts a block diagram of a network portion 400. A server 402 is coupled by a link 404 to a switch 406. An exemplary server 402 is a server 102 of FIG. 1, and an exemplary switch 406 is a switch 106 of FIG. 1. A controller 408 (e.g., a network controller) is linked to the switch 406 by, e.g., a secure link 410. In one embodiment, in OpenFlow-capable environments, the controller is a network controller such as network controller 112 of FIG. 1. In other embodiments, for non-OpenFlow environments, functions of the controller 408 can be integrated into other network entities such as the server 402 or server 102.

As shown in FIG. 4, the switch 406 is connected to the server 402, which includes at least one port 412 and various logical components such as mode selection logic 414, wait pulse repetition time 416, and protocol and mode of operation configuration 418. Logical components described herein can be implemented in instructions stored in a computer readable storage medium for execution by a processing circuit or in hardware circuitry, and can be configured to send frames such as link initialization frames and data packets. The switch 406, server 402 and controller 408 may support a number of modes of operation including, but not limited to, Ethernet, Fibre Channel, Fibre Channel over Ethernet (FCoE), Internet Wide Area Remote direct memory access Protocol (iWARP), and Remote direct memory access over Converged Ethernet (RoCE).

The switch 406 includes switch logic 420, flow table 422, protocol support 424, port configuration and reset logic 425 and multiple ports 426 for communicating with the server 402 and other network entities such as other switches or servers. The ports may be physical ports, virtual ports defined by the switch, and/or a virtual port defined by the OpenFlow protocol. Each port may be attached to one or more port queues 428. When implemented as an OpenFlow switch, the switch 406 also includes a secure channel 430 for communicating with the network controller 408 on secure link 410.

In one embodiment, the network controller 408 is connected to the switch 406 via an electrical link, an optical link or both an electrical and optical link. For example, the switch 406 includes an optical port 432 connected to the controller 408 via an optical link 434. The optical port is connected to a WDM module 436 including, e.g., an optical transceiver. The optical port 432 and WDM module 436 may be controlled via suitable processing components, such as the switch logic 420 or optical switching logic 438. Optical processing components including, e.g., the WMD module 436, may be integrated into the switch 406 or a modular unit plugged into the switch 406.

Still referring to FIG. 4, the network controller 408 includes an action table 440 that holds port and protocol information for the switch 406, as well as rules, actions, and statistics for flows through the switch 406 and other switches, such as switches 106 of FIG. 1. The network controller 408 also includes flow control logic 442 that can be implemented in instructions stored in a computer readable storage medium for execution by a processing circuit or in hardware circuitry. The network controller 408 can manage updates of the flow table 422 in the switch 406. Based on the updating of the flow table 422, the port and protocol information in the action table 432 of the network controller 408 is updated to reflect the changes.

In one embodiment, the controller 408 includes or is connected to an optical interface system 444 implemented via, e.g., optical interface logic 446. The optical interface 444 is configured to receive optical signals transmitting data to be routed by one or more switches 406, and to transmit optical signals carrying data and/or controls. In one embodiment, the controller 408 receives data in the form of electrical signals or modulated optical signals and is configured to determine which wavelengths are available for use in routing optical signals. The controller 408 may determine this based on information received from a source such as a server in which the controller 408 resides, or by automatically detecting from the switch 408 which wavelengths are available. The controller 408 may then tune the signal interface 444 to appropriate wavelength(s) and forward signals to the switch 406 for routing. In the embodiment of FIG. 4, the optical interface 444 includes components such as an optical receiver 448 for receiving and/or sending optical signals, a WDM unit 450 including a modulator 452, and a tunable laser 454, and any other components required to perform the methods described herein.

As indicated above, the network controller 408 communicates with the switch 406 via a secure link 410 and/or optical link 434 (also referred to as a control link) established using a specified port, such as a port in a physical network controller 112 or a controller implemented in other processors, such as a server 102 or client system 104.

The network controller 408 communicates with the switch 406 to configure and manage the switch, receive events from the switch and send packets out the switch. Various message types can be sent between the switch and the controller to accomplish such functions, including controller-to-switch, asynchronous and symmetric messages.

Figure 5:
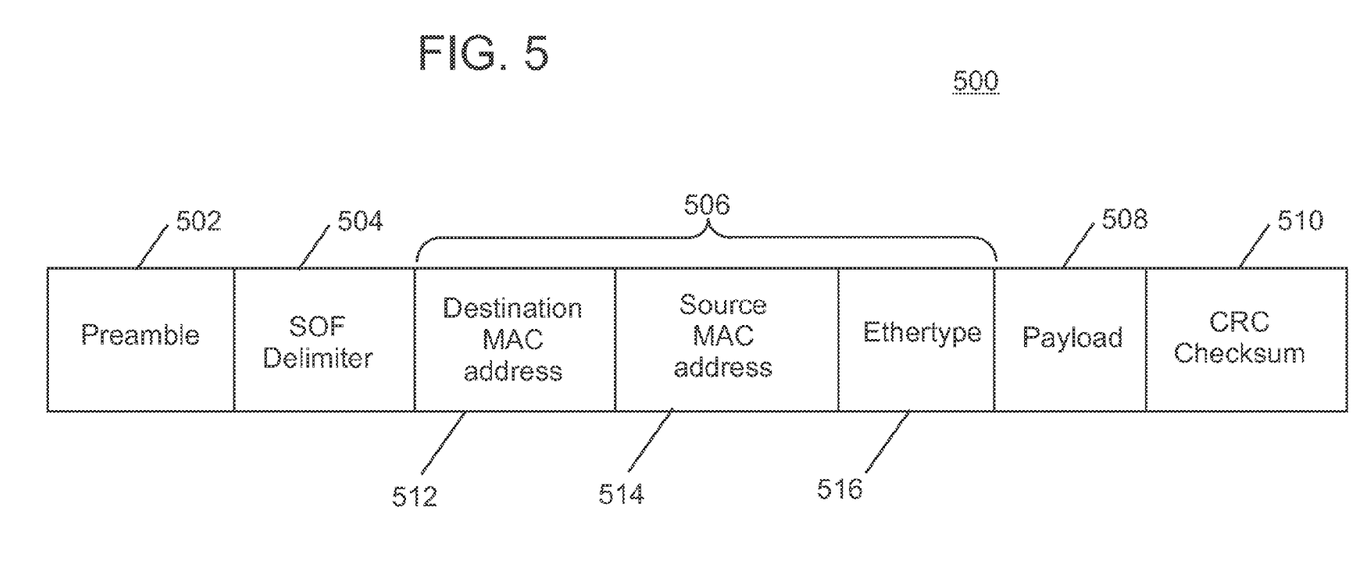
FIG. 5 depicts an example of a data packet.

FIG. 5 depicts an embodiment of a data frame or data packet 500 that may be forwarded to and from the switch 406 and/or used for communication between the switch 406 and the controller. The data packets may be transmitted electrically or via optical carrier signals. The data packet 500 includes a preamble 502, a start of frame (SOF) delimiter 504, a header 506, payload data 508 and a cyclic redundancy check (CRC) checksum 510. The header 506 includes network address information and protocol information. For example, the frame 500 includes a destination MAC address 512, a source MAC address 514 and an Ethernet type field 516.

Figure 6:
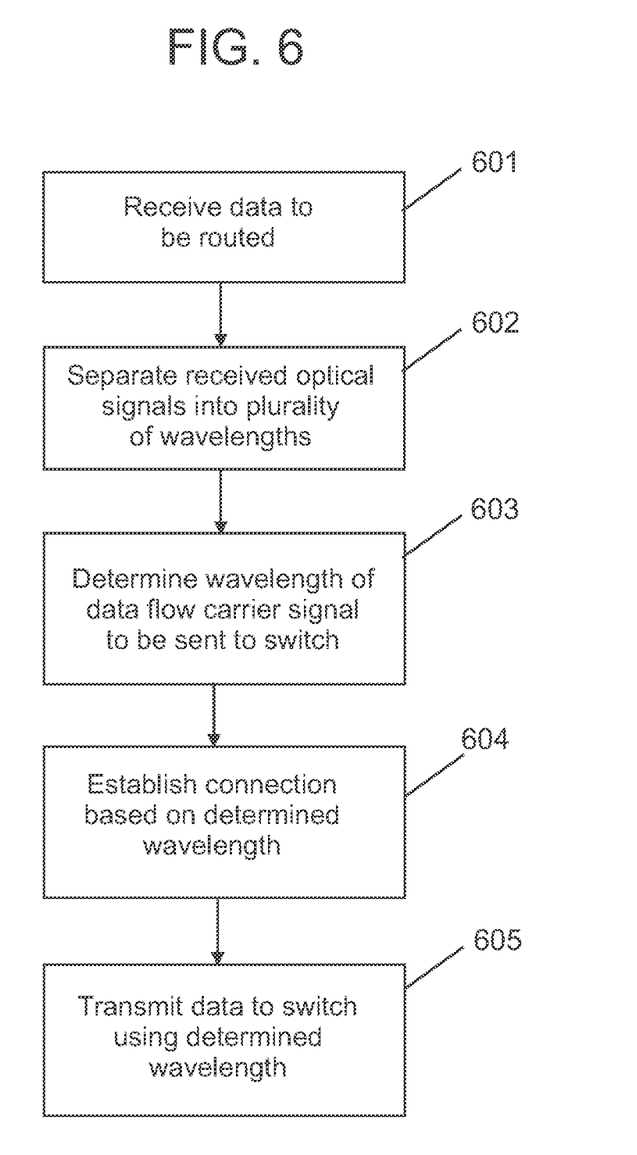
FIG. 6 is a flow diagram showing a method of processing and/or routing data flows transmitted via optical signals in a network.

An embodiment of a method 600 of processing and/or routing optical signal data flows in a network is described with reference to FIG. 6. The method 600 is described in conjunction with the network portion 400 shown in FIG. 4, but is not so limited. In one embodiment, the method includes the steps represented by blocks 601-605 in the order described. However, in some embodiments, not all of the steps are performed and/or the steps are performed in a different order than that described.

At block 601, the controller 408 receives data as data flows to be routed through one or more switches 406. The data may be received via optical signals to be routed or via electrical data signals to be converted to optical signals.

At block 602, in one embodiment, the controller 408, via the optical interface 444, separates the bandwidth of the received data flows into a plurality of wavelengths using, e.g., the WMD module 450. The optical signals at each wavelength may be processed via a converter to extract the data flows to be routed.

At block 603, the controller 408 determines the wavelength(s) at which the data flow is to be forwarded to the switch 406. In one embodiment, the controller 408 receives information from a server or other entity regarding which wavelengths to plug to the switch 406. For example, the controller 408 provisions all wavelengths in the current WDM band (e.g., a DWMD band including 80 wavelengths). Each wavelength may be monitored to keep track of available wavelengths using a wavelength band table or other data structure. Each band can be kept track of by the controller 408 as if it were a data flow (e.g., associate flow control information such as wavelength assignments to specific switches or data flows) and store wavelength information in a configuration similar to a flow table.

In one embodiment, the controller 408 determines the wavelength by sending a control signal to the switch 406 to determine which wavelengths of the total bandwidth are available in the switch 406. For example, the controller 408 scans the plurality of wavelengths by transmitting a signal for each wavelength to the switch 406. A wavelength filter (e.g., filter 228) in the switch 406 returns a feedback signal via the optical link 434 upon receiving a wavelength that matches a filter wavelength. The wavelength filter may be a tunable filter that can be tuned by the switch 406 to reflect available wavelengths based on current signal routing.

The switch 406 can use either an electrical link (e.g., secure link 410) or an optical link (e.g., optical link 434) to return a signal indicating an available wavelength or wavelengths. Thus, the switch can send wavelength information to the controller as an optical or an electrical signal.

In one embodiment, the controller sends the control signal over the optical link using an amplitude modulated signal (e.g., having a relatively low bandwidth) that is used by the controller 408 and the switch 406 to exchange available wavelength information. The control signal may also be used to transmit wavelength identification information and/or other control information to the switch and/or to new ports as they are connected in communication with the controller.

At block 604, once the controller has determined the wavelengths that may be used to forward data, the controller establishes a connection between the source and the switch and/or destination based on the wavelength identification. The controller handles management and control data for the switch, but, in one embodiment, may not handle the user data that is being sent over the switch.

At block 605, the controller 408 converts the data flow into optical signal(s) at the determined wavelengths and sends the optical signals via the modulator 452 and the tunable laser 454 to the optical port 432 and the switch 406. In one embodiment, the controller 408 sends the modulated signals as data flows that are processed as data packets (e.g., data packets and/or control packets) as described above.

The controller, in one embodiment, performs portions of the method 600 in a link initialization process to establish an optical link between the controller and one or more switches. In the initialization process, the controller establishes a physical link by plugging an optical fiber connector into some location on the filter. The controller then uses a tunable laser to scan all wavelengths in a selected bandwidth (e.g., a 20-80 channel C-band or L-band). The controller transmits a signal in each wavelength to the filter. When the transmitted wavelength matches the filter, the filter generates a loopback signal to the controller. The controller may then lock the wavelength and prepare to transmit data using the locked wavelength.

Figure 7:
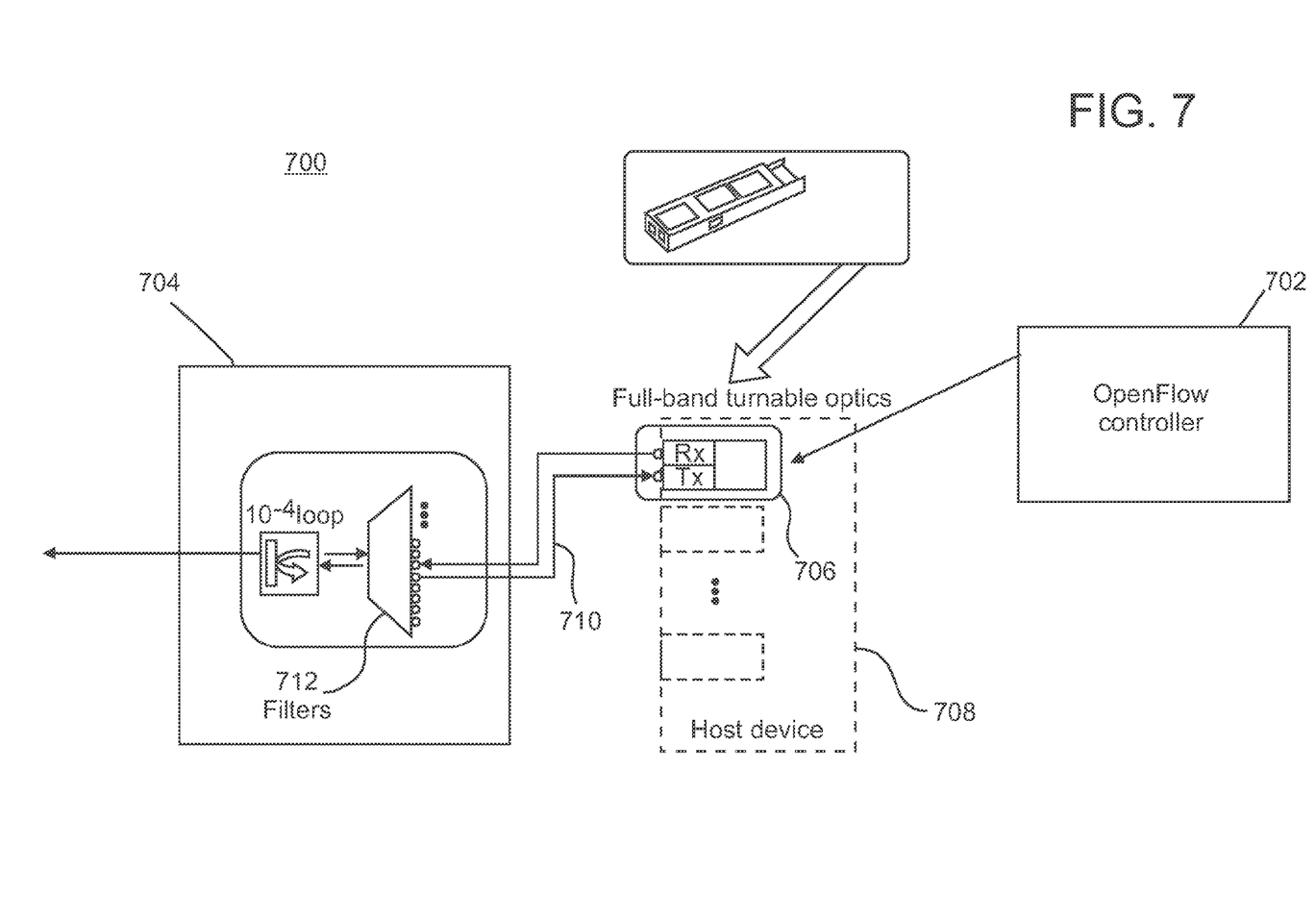
FIG. 7 depicts an exemplary network portion including a network controller and a network switch.

FIG. 7 shows an embodiment of a portion of a network 700 that includes an OpenFlow controller 702 and one or more OpenFlow switches 704. In this embodiment, the controller 702 is embodied with a plug-in tunable optical module 706 that includes a tunable laser, input and output ports Rx and Tx and suitable logical and physical components configured to allow the controller to perform the wavelength determination and optical signal routing controls described above. The module is plugged into a network component or processor such as a server 708 and is connected via an optical link 710 to the switch 704. The switch 704 includes an exemplary optical filter 712.

For example, a wavelength tunable integrated or pluggable optical transceiver is inserted into a network switch connected to a network controller via an electrical and/or optical control link. The transceiver scans its wavelengths and determines which wavelengths are in use by the optical filter in the switch. When an available wavelength is found, a feedback signal is generated (e.g., via a feedback loop with 10e-4 loss shown in FIG. 7) that provides an optical signal back to the receiving end of the transceiver. This signal is then sent back to the network controller, over either an optical or copper link. The controller thus knows which wavelengths are available for transmission, and can assign an appropriate available wavelength to the transceiver. The transceiver locks onto this wavelength, completing the initialization process, and begins to transmit data.

Technical effects include providing an ability for network controllers such as OpenFlow controllers to integrate switching control with control of optical communications. In addition, the systems provided herein avoid the need to include optical transceivers for multiple wavelength bands in each field location in a network or data center, by centralizing optics in a network controller.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible and non-transitory storage medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method of controlling optical data flow in a network, comprising:
   receiving, by a switch controller, a data flow including a plurality of data packets used for network management and control, the switch controller configured to control routing through a network switch, the switch controller in communication with the network switch via a control link, the network switch including at least one wavelength tunable optical data transmission interface to a wavelength division multiplexed optical network;
   transmitting a control signal indicating which wavelengths are in use and which wavelengths are not in use to the network switch over a control link;
   receiving a return signal from the network switch, the return signal generated by an optical filter in the switch, the return signal indicative of an available wavelength for transmission of the data flow to the switch;
   allocating a data traffic flow to the available wavelength, and communicating the allocation decision to the network switch; and
   transmitting the data flow to the switch via an optical carrier signal having the available wavelength indicated by the return signal.

2. The method of claim 1, wherein the network switch is an OpenFlow switch and the switch controller is an OpenFlow switch controller.

3. The method of claim 1, wherein receiving the data flow includes receiving an optical signal at an optical receiver connected to the controller, and separating the optical signal into the plurality of wavelengths.

4. The method of claim 1, wherein the optical filter is configured to be tuned to the available wavelength, the return signal generated by the control signal including a wavelength that matches the available wavelength.

5. The method of claim 1, wherein the control link includes an optical link and a secure electrical link.

6. The method of claim 1, wherein the network switch includes a plurality of network switches.

7. The method of claim 1, wherein the controller is configured as a control plane for controlling both optical transmission through a plurality of OpenFlow switches and electrical signal transmission through the plurality of OpenFlow switches.

8. A method of controlling optical data flow in a network, comprising:
   receiving an optical signal at a network switch from a network controller, the network switch configured to receive and route data packets in a network, the optical signal including a plurality of wavelengths corresponding to an optical communication bandwidth the network switch including at least one wavelength tunable optical data transmission interface to a wavelength division multiplexed optical network;
   generating a return optical signal by an optical filter in the switch and transmitting the return signal over a control link to the network controller, the return signal indicative of an available wavelength for transmission of the data flow to the switch;
   receiving the data flow via an optical carrier signal having the available wavelength indicated by the return signal; and
   routing the data flow to a destination based on instructions from the network controller.

9. The method of claim 8, wherein the instructions are stored in a flow table in the network switch, the flow table including instructions associated with the data flow.

10. The method of claim 8, wherein routing the data flow includes at least one of: converting the optical signal to an electrical signal and forwarding the data flow to the destination via the electrical signal, and forwarding the data flow as an optical signal to the destination.

11. The method of claim 8, wherein the network switch is an OpenFlow switch and the switch controller is an OpenFlow switch controller.

12. The method of claim 8, wherein the optical filter is configured to be tuned to the available wavelength, the return signal generated by the control signal including a wavelength that matches the available wavelength.

13. The method of claim 8, wherein the control link includes an optical link and a secure electrical link.

14. An apparatus for controlling optical data flow in a network, comprising:
   a memory having computer readable computer instructions; and
   a processor for executing the computer readable instructions, the instructions including:
   receiving, by a switch controller, a data flow including a plurality of data packets used for network management and control, the switch controller configured to control routing through a network switch, the switch controller in communication with the network switch via a control link, the network switch including at least one wavelength tunable optical data transmission interface to a wavelength division multiplexed optical network;
   transmitting a control signal indicating which wavelengths are in use and which wavelengths are not in use to the network switch over a control link;
   receiving a return signal from the network switch, the return signal generated by an optical filter in the switch, the return signal indicative of an available wavelength for transmission of the data flow to the switch;
   allocating a data traffic flow to the available wavelength, and communicating the allocation decision to the network switch; and
   transmitting the data flow to the switch via an optical carrier signal having the available wavelength indicated by the return signal.

15. The apparatus of claim 14, wherein the network switch is an OpenFlow switch and the switch controller is an OpenFlow switch controller.

16. The apparatus of claim 14, wherein receiving the data flow includes receiving an optical signal at an optical receiver connected to the controller, and separating the optical signal into the plurality of wavelengths.

17. The apparatus of claim 14, wherein the optical filter is configured to be tuned to the available wavelength, the return signal generated by the control signal including a wavelength that matches the available wavelength.

18. The apparatus of claim 14, wherein the controller is configured as a control plane for controlling both optical transmission through a plurality of OpenFlow switches and electrical signal transmission through the plurality of OpenFlow switches.

19. A computer program product for controlling optical data flow in a network, the computer program product comprising:
- a tangible storage medium readable by a processing circuit and storing instructions for execution by the processing circuit for performing a method comprising:
- receiving, by a switch controller, a data flow including a plurality of data packets used for network management and control, the switch controller configured to control routing through a network switch, the switch controller in communication with the network switch via a control link, the network switch including at least one wavelength tunable optical data transmission interface to a wavelength division multiplexed optical network;
- transmitting a control signal indicating which wavelengths are in use and which wavelengths are not in use to the network switch over a control link;
- receiving a return signal from the network switch, the return signal generated by an optical filter in the switch, the return signal indicative of an available wavelength for transmission of the data flow to the switch;
- allocating a data traffic flow to the available wavelength, and communicating the allocation decision to the network switch; and
- transmitting the data flow to the switch via an optical carrier signal having the available wavelength indicated by the return signal.

20. The computer program product of claim 19, wherein the network switch is an OpenFlow switch and the switch controller is an OpenFlow switch controller.

21. The computer program product of claim 19, wherein receiving the data flow includes receiving an optical signal at an optical receiver connected to the controller, and separating the optical signal into the plurality of wavelengths.

22. The computer program product of claim 19, wherein the optical filter is configured to be tuned to the available wavelength, the return signal generated by the control signal including a wavelength that matches the available wavelength.

23. The computer program product of claim 19, wherein the controller is configured as a control plane for controlling both optical transmission through a plurality of OpenFlow switches and electrical signal transmission through the plurality of OpenFlow switches.

24. A computer program product for controlling optical data flow in a network, the computer program product comprising:
- a tangible storage medium readable by a processing circuit and storing instructions for execution by the processing circuit for performing a method comprising:
- receiving an optical signal at a network switch from a network controller, the network switch configured to receive and route data packets in a network, the optical signal including a plurality of wavelengths corresponding to an optical communication bandwidth, the network switch including at least one wavelength tunable optical data transmission interface to a wavelength division multiplexed optical network;
- generating a return optical signal by an optical filter in the switch and transmitting the return signal over an optical link to the network controller, the return signal indicative of an available wavelength for transmission of the data flow to the switch;
- receiving the data flow via an optical carrier signal having the available wavelength indicated by the return signal; and
- routing the data flow to a destination based on instructions from the network controller.

25. The computer program product of claim 24, wherein the optical filter is configured to be tuned to the available wavelength, the return signal generated by the control signal including a wavelength that matches the available wavelength.

* * * * *